(12) United States Patent
French

(10) Patent No.: US 12,681,176 B2
(45) Date of Patent: Jul. 14, 2026

(54) MEASURING DEVICE

(71) Applicant: Michael French, Idaho Falls, ID (US)

(72) Inventor: Michael French, Idaho Falls, ID (US)

( * ) Notice: Subject to any disclaimer, the term of this patent is extended or adjusted under 35 U.S.C. 154(b) by 0 days.

(21) Appl. No.: 19/291,877

(22) Filed: Aug. 6, 2025

(65) Prior Publication Data

US 2026/0043919 A1     Feb. 12, 2026

Related U.S. Application Data

(60) Provisional application No. 63/681,220, filed on Aug. 9, 2024.

(51) Int. Cl.
| | |
|---|---|
| *G01S 17/08* | (2006.01) |
| *G01C 9/34* | (2006.01) |
| *G01C 15/00* | (2006.01) |
| *G01K 7/22* | (2006.01) |

(52) U.S. Cl.
CPC ................ *G01S 17/08* (2013.01); *G01C 9/34* (2013.01); *G01C 15/004* (2013.01); *G01K 7/22* (2013.01)

(58) Field of Classification Search
CPC ......... G01S 17/08; G01C 9/34; G01C 15/004; G01K 7/22
See application file for complete search history.

(56) References Cited

U.S. PATENT DOCUMENTS

| | | | | | |
|---|---|---|---|---|---|
| 1,701,603 | A | * | 2/1929 | Bauer | G01C 17/38 |
| | | | | | 33/348 |
| 2,132,170 | A | * | 10/1938 | Langsner | G01C 1/02 |
| | | | | | 33/299 |

| | | | | | |
|---|---|---|---|---|---|
| 2,590,803 | A | * | 3/1952 | Unger | H01F 27/02 |
| | | | | | 220/614 |
| 3,221,925 | A | * | 12/1965 | Brister | F16J 13/06 |
| | | | | | 220/582 |
| 4,660,736 | A | * | 4/1987 | Mays | B65D 45/02 |
| | | | | | 220/327 |
| 6,430,823 | B1 | * | 8/2002 | Seki | G01C 15/004 |
| | | | | | 33/286 |
| 6,461,002 | B1 | * | 10/2002 | Su | G03B 21/22 |
| | | | | | 248/188.4 |
| 8,006,397 | B2 | * | 8/2011 | Schubert | G01C 9/06 |
| | | | | | 33/366.11 |

(Continued)

OTHER PUBLICATIONS

CN-209767293-U; Lin "A Reinforcement-type Dust-proof Junction Box Device", 2019. (Year: 2019).*

(Continued)

*Primary Examiner* — Kristina M Deherrera
*Assistant Examiner* — Tania Courson

(57) ABSTRACT

A measuring device includes a housing with a first, upper section coupleable to a second, lower section. An upper surface of the first section may include a first bubble level and a second bubble level perpendicular to the first bubble level. Each side of the housing may include a laser. The measuring device includes adjustable fasteners that aid in leveling the device on any surface. A bottom side of the second section may include a first member and a second member that are removably attachable to each other, and once separated, allow access to an internal compartment that includes a computing and power system. The measuring device may connect to a smart device and a mobile application to provide to a user numerous types of measurements.

9 Claims, 12 Drawing Sheets

(56) References Cited

U.S. PATENT DOCUMENTS

| | | | | |
|---|---|---|---|---|
| 8,671,991 | B2* | 3/2014 | Zeyfang ................ | F16L 23/003 |
| | | | | 138/96 R |
| 9,291,447 | B2* | 3/2016 | Bumgardner | |
| 9,377,303 | B2* | 6/2016 | Giger ..................... | G08C 17/00 |
| 9,846,034 | B2* | 12/2017 | Hill ....................... | G01C 15/004 |
| 11,922,722 | B2* | 3/2024 | Reddy ................. | A61B 5/0022 |
| 2007/0044332 | A1* | 3/2007 | Yung .................... | G01C 15/002 |
| | | | | 33/286 |
| 2013/0167386 | A1* | 7/2013 | Peng .................... | G01C 15/004 |
| | | | | 33/290 |
| 2015/0354942 | A1* | 12/2015 | Bridges ................. | G01B 11/14 |
| | | | | 33/503 |

OTHER PUBLICATIONS

CN-218603293-U; Chen, "A Stepping Motor Junction Box", 2023
(Year: 2023).*

* cited by examiner

100

100

100

200

200

210

MEASURING DEVICE

CROSS-REFERENCE TO RELATED APPLICATIONS

This application claims the benefit of U.S. Provisional Application Ser. No. 63/681,220, filed on Aug. 9, 2024, which is incorporated herein by reference.

TECHNICAL FIELD

The present disclosure relates to a measuring device. More particularly, the present disclosure relates to a device that measures distances, temperatures, among other things for construction workers, military, etc.

BACKGROUND

Construction has been an important industry for many years. There have been millions upon millions of dollars spent on construction equipment. This equipment is used in every imaginable area of construction from commercial to residential construction and everything in between.

There are many devices that are used for a single construction project, such as when installing tile. Some of these devices may include a level, tape measure, thermometer, saws, etc. An important aspect of installing tile is ensuring that the temperature in the structure is warm enough to set the tile mortar. If tile mortar does not set, tiles may move and may have to be reinstalled.

To measure temperatures in rooms, users are often left to using thermometers and vehicle temperature gauges, if possible, both have inherent shortcomings. Many thermometers on the market are limited in their abilities. For example, these thermometer devices are limited to one function: reading temperature. This means that a user would have to purchase, store, and transport numerous tools to accomplish each tile-laying task. With regard to vehicle temperature gauges, this approach is often not accurate enough to guarantee that tile should be installed. Furthermore, difficulties also arise due to the fact that temperatures will vary from floor to floor in buildings that have multiple levels, meaning temperature devices will have to be used for each floor.

Accordingly, there is a need for a single device that measures temperature in structures and provides many other measurements for a user. The present invention seeks to solve these and other problems.

SUMMARY OF EXAMPLE EMBODIMENTS

In one embodiment, a measuring device includes a housing with a first, upper section coupleable to a second, lower section. The first section may have a lesser depth than the second section. The first section may include a first wing at a first end and a second wing on a second end both on a first side. The first section may include a third wing at the second end and a fourth wing on the first end both on a second side. An upper surface of the first section may include a first bubble level and a second bubble level perpendicular to the first bubble level. The upper surface may include a first laser recessed therein. The upper surface may include a window.

The second section may be removably attachable to the first section. The second section may include a front side, a rear side, a primary side, a secondary side, and a bottom side. Each of these sides may include lasers. The lasers may be used for range finding and a plumb bob on a mobile application. As such, the lasers provide vertical or horizontal alignment, thereby enhancing accuracy and ease of use compared to traditional physical plumb bobs. In some embodiments, the lasers may be multi-directional lasers that are capable of measuring temperature (e.g., laser thermometers).

Furthermore, the second section may include primary wings on a first end of the primary side and secondary wings on a second end, opposite the first end, of the primary side. Tertiary wings may be on a first end of the secondary side and quaternary wings may be on a second end, opposite the first end, of the secondary side. The primary wings may align with the first wing, thereby allowing the first aperture to align with primary apertures and receive a first adjustable fastener therethrough. The secondary wings may align with the second wing, thereby allowing the second aperture to align with secondary apertures and receive a second adjustable fastener therethrough. The tertiary wings may align with the third wing, thereby allowing the third aperture to align with tertiary apertures and receive a third adjustable fastener therethrough. The quaternary wings may align with the fourth wing, thereby allowing the fourth aperture to align with quaternary apertures and receive a fourth adjustable fastener therethrough. The adjustable fasteners aid in leveling the measuring device on any surface. That is, the adjustable fasteners allow each corner of the measuring device to be adjusted on a y-axis.

The bottom side of the second section may include a first member and a second member that are removably attachable to each other and once separated, allow access to an internal compartment. The first member may include a first slot and a first protrusion, and the second member may include a second slot and a second protrusion. The first and second members may couple to each other by positioning the first protrusion into the second slot and the second protrusion into the first slot until a first middle edge of the first member and a second middle edge of the second member are mated or in contact with each other. The measuring device may additionally include a computing system and a power system positioned in the internal compartment.

In one embodiment, the measuring device communicates with a mobile application on a smart device.

DETAILED DESCRIPTION OF EXAMPLE EMBODIMENTS

Figure 1:
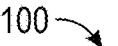
FIG. 1 illustrates a front perspective view of a measuring device.
Figure 1:
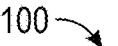

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described. Certain terms are used herein, such as "comprising" and "including," and similar terms are meant to be "open" and not "closed" terms.

As previously described, there is a need for a single device that measures temperature in structures and provides many other measurements for a user. The present invention seeks to solve these and other problems.

The construction industry requires numerous pieces of equipment to perform any job, whether these jobs are performed by a single person or a large company. For example, there are many devices that are required when installing tile. Some of these devices may include a level, tape measure, thermometer, saws, etc. Whether a single person or a company, purchasing and maintaining all of these devices can be expensive, especially for the single user that may be looking to perform a type of construction job one time. Furthermore, any user would have to understand how to use each and every piece of equipment to perform a job, with most of these pieces of equipment not typically being user friendly.

The measuring device described herein includes a housing that comprises multiple components that can measure distance, temperature, levelness, and other things. The measuring device can function on its own or with a mobile application. The mobile application may be able to control the measuring device and its components. The mobile application may include numerous screens that may be accessed to adjust the measuring device, access difference components, and adjust settings, to name a few functionalities. It will be appreciated that the measuring device allows a user to perform numerous functions in a single device so as to increase efficiency in the construction industry.

Figure 2:
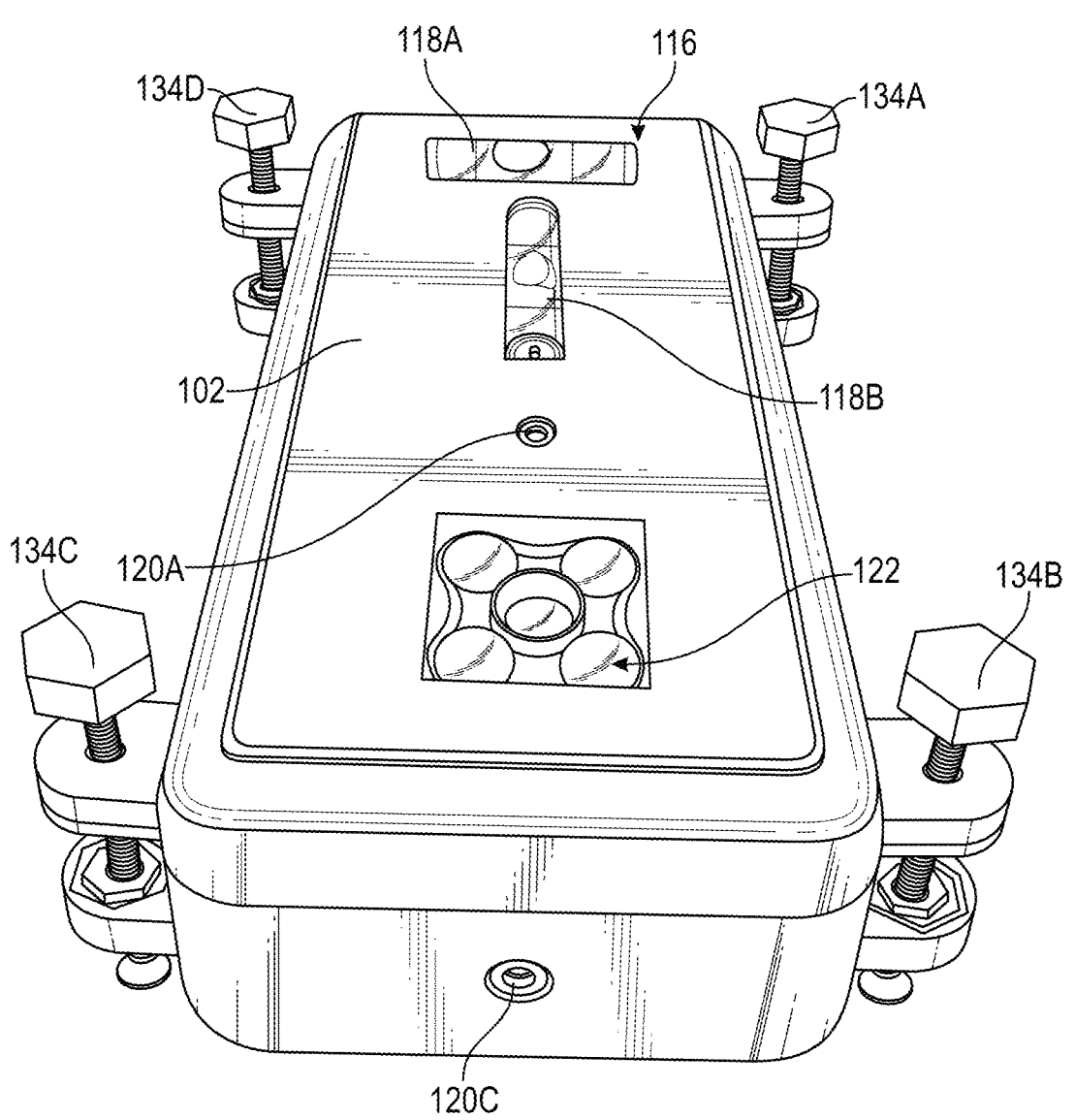
FIG. 2 illustrates a rear perspective view of a measuring device.
Figure 3:
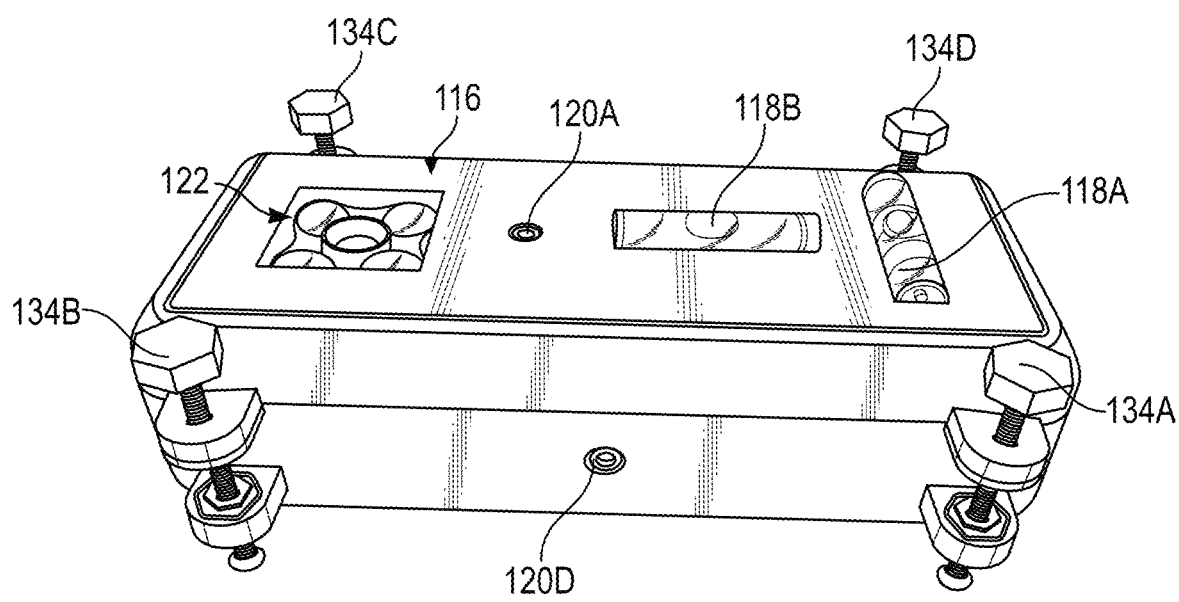
FIG. 3 illustrates a left-side perspective view of a measuring device.
Figure 4:
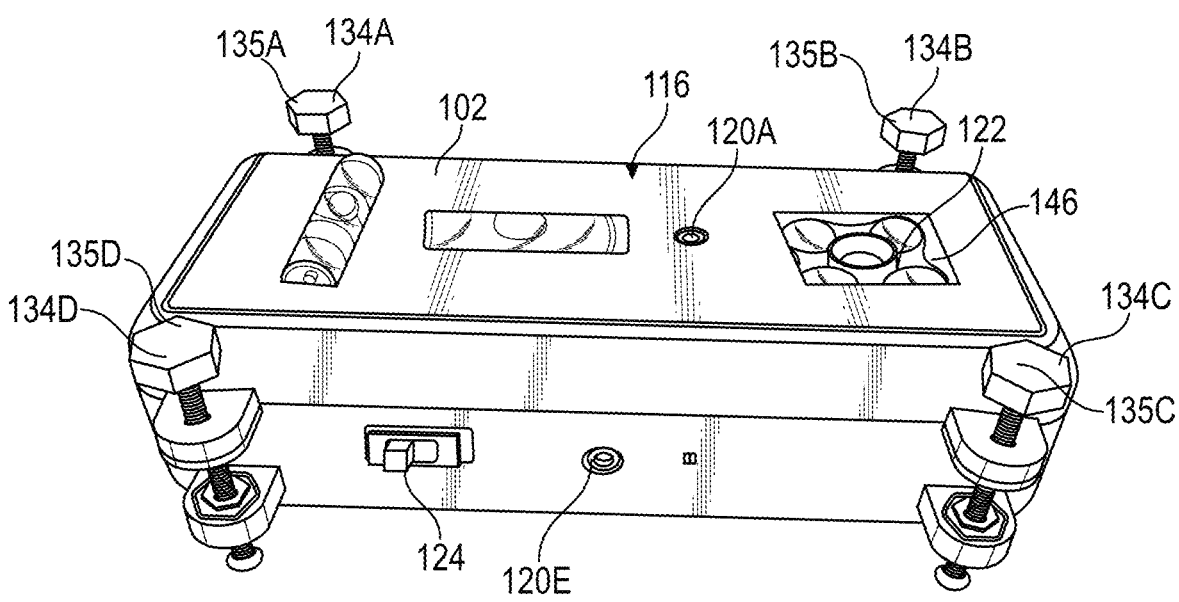
FIG. 4 illustrates a right-side perspective view of a measuring device.
Figure 5:
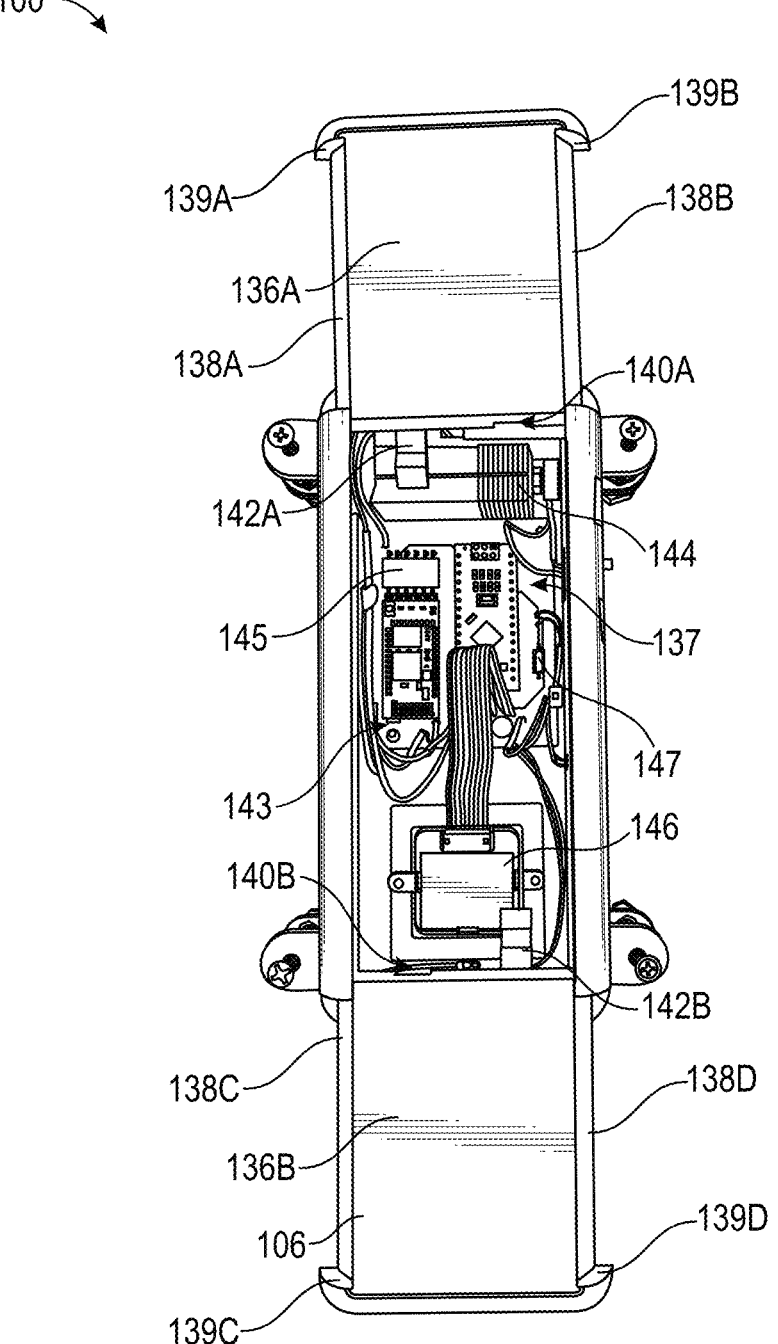
FIG. 5 illustrates a bottom plan view of a measuring device in an open configuration.

As shown in FIGS. 1-5, in one embodiment, a measuring device 100 includes a housing 102 with a first, upper section

104 removably attachable to a second, lower section 106. The first section 104 may have a lesser depth than the second section 106. However, in some embodiments, the first section 104 and second section 106 may have the same depth, or the first section 104 may have a greater depth than the second section 106. The first section 104 may be removably attachable to the second section 106 via press fittings, snaps, screws, or any other fastening mechanism. In some embodiments, the first and second sections 104, 106 may be coupled to each other via an adhesive. Corners of both the first and second sections 104, 106 may be rounded. While shown as being rounded, it will be appreciated that the corners may be angled, straight, etc. The housing 102 may be generally rectangular in shape. Other housing shapes may include circular, ovular, etc. The housing 102 may be manufactured from any type of plastic, metals, woods, other types of material used in the art, or any combination thereof. The housing 102 may also be manufactured via three-dimensional printing, injection molding, compression molding, welding, or any other types of manufacturing processes.

The first section 104 may include a first wing 108 at a first end and a second wing 110 on a second end, both being on a first side. The first wing 108 may extend outward from the first section 104 and include a first aperture and the second wing 110 may extend outward from the first section 104 and include a second aperture. The first section may also include a third wing 112 at the second end and a fourth wing 114 on the first end, both being on a second side. The third wing 112 may extend outward from the first section 104 and include a third aperture and the fourth wing 114 may extend outward from the first section 104 and include a fourth aperture. In some embodiments, the first, second, third, and fourth wings 108, 110, 112, 114 may be removably attachable to the first and second sides. An upper surface 116 of the first section 104 may include a first bubble level 118A that is embedded therein and a second bubble level 118B perpendicular to the first bubble level 118A and embedded therein. The first and the second bubble levels 118A, 118B may be fastened to the upper surface 116 via adhesives, brackets, screws, magnets, some combination thereof, or any other type of securement mechanism. The upper surface 116 may include a first laser 120A that is recessed and secured therein. The upper surface 116 may further include a window 122.

The second section 106 may be removably attachable to the first section 104. The second section 106 may include a front side, a rear side, a primary side, a secondary side, and a bottom side. Each of these sides may include lasers. That is, the front side includes a second laser 120B, the rear side may include a third laser 120C, the primary side may include a fourth laser 120D, and the secondary side may include a fifth laser 120E. The lasers 120A-120E may be used for a plumb bob, range finding, bubble level, etc. on a mobile application. In this manner, the lasers 120A-120E provide vertical or horizontal alignment information to the measuring device 100, thereby enhancing accuracy and ease of use compared to traditional physical plumb bobs, or other measuring devices. In some embodiments, the lasers 120A-120E may be multi-directional lasers that are capable of measuring temperature (e.g., laser thermometers); or, in other embodiments, the lasers 120A-120E may measure distance, meaning when the measuring device 100 is placed on a surface, the lasers 120A-120E may be sent to the next closest surface that then returns the reflected laser beam to the measuring device 100, where the measuring device 100 receives and either transmits or analyzes the received data to determine distance. While five lasers are shown on the device 100, it will be appreciated that there may be more or less than five lasers and more or less than one laser on any given surface. Furthermore, the positioning of each laser may be changed, that is, to any surface of the device 100. The secondary side may include a power switch 124. In other embodiments, the power switch 124 may be placed on any other position of the housing 102 or may be a remote switch that communicates with the measuring device 100, either wirelessly or via a wire.

Furthermore, the second section 106 may include primary wings 126A, 126B on a first end of the primary side and secondary wings 128A, 128B on a second end, opposite the first end, of the primary side. The primary wings 126A, 126B may include primary apertures, one of which may receive a nut or another type of coupler, and the secondary wings 128A, 128B may include secondary apertures, one of which may receive a nut or another type of coupler. Tertiary wings 130A, 130B may be on the second end of the secondary side and quaternary wings 132A, 132B may be on the first end, opposite the second end, of the secondary side. The tertiary wings 130A, 130B may include tertiary apertures, one of which may receive a nut or another type of coupler, and the quaternary wings 132A, 132B may include quaternary apertures, one of which may receive a nut or another type of coupler. While four wings are shown on the primary and secondary sides, it will be appreciated that there may be more or less than four wings on the primary and secondary sides or any of the other sides.

The primary wings 126A, 126B may align with the first wing 108, thereby allowing the first aperture to align with the primary apertures and receive a first adjustable fastener 134A therethrough. The secondary wings 128A, 128B may align with the second wing 110, thereby allowing the second aperture to align with the secondary apertures and receive a second adjustable fastener 134B therethrough. The tertiary wings 130A, 130B may align with the third wing 112, thereby allowing the third aperture to align with the tertiary apertures and receive a third adjustable fastener 134C therethrough. The quaternary wings 132A, 132B may align with the fourth wing 114, thereby allowing the fourth aperture to align with the quaternary apertures and receive a fourth adjustable fastener 134D therethrough. Any of the apertures on the wings may include threads or threaded fasteners such as nuts. The first adjustable, second adjustable, third adjustable, and fourth adjustable fasteners 134A-134D may each include a knob 135A-135D that is coupled to an end thereof, or an end of a bolt. The bolts may pass through the apertures. The adjustable fasteners 134A-134D aid in leveling the measuring device 100 on any surface. To level the device 100, a user may twist any of the adjustable fasteners utilizing the knobs, thereby lowering or raising any portion of the measuring device 100. The first and second bubble levels 118A, 118B on the upper surface of the first section 104 allow a user to know which of the adjustable fasteners 134A-134D need to be adjusted. It will be appreciated that there may be more or less than four adjustable fasteners. Furthermore, in some embodiments, there may be legs/adjustable fasteners that are self-leveling or automatically level the measuring device 100.

The bottom side of the second section 106 may include a first member 136A and a second member 136B that are removably attachable to each other and once separated, allow access to an internal compartment 137. The first and second members 136A, 136B may make up the bottom of the measuring device 100 and be slidable on the bottom side. The first member 136A may include first ridges 138A, 138B that slide into channels on inner surfaces of the bottom side. Likewise, the second member 136B may include second ridges 138C, 138D that slide into the channels on an end opposite insertion of the first member 136A. The first member 136A may further include a first finger 139A and a second finger 139B, which prevent the first member 136A from being pushed too far down the channels. The second member 136B may further include a third finger 139C and a fourth finger 139D, which prevent the second member 136B from being pushed too far down the channels. Furthermore, the first member 136A may include a first slot 140A and a first protrusion 142A, and the second member 136B may include a second slot 140B and a second protrusion 142B. The first and second members 136A, 138B may couple to each other by positioning the first protrusion 142A in the second slot 140B and the second protrusion 142B in the first slot 140A until a first middle edge of the first member 136A and a second middle edge of the second member 136B are mated or in contact with each other. It will be appreciated that the first and second protrusions 142A, 142B may have peaks that engage with certain peaks and/or valleys within the first and second slots 140A, 140B so as to snap together or secure the first member 136A to the second member 136B.

It will be understood that the various components of the measuring device 100 may be rearranged on portions or sections of the housing whether internally or externally without departing herefrom.

The measuring device 100 may additionally include internal components, such as a computing system 143 and a power system 144 positioned in the internal compartment 137. The computing system 143 may include a microcontroller 145, such as a Raspberry Pi Pico® and/or an Arduino Nano®, or any other type of controller. The microcontroller 145 controls a thermistor 147 and manages range finder capabilities, which allows a sophisticated yet compact platform for data processing and Wi-Fi communication with a mobile application. The computing system may be capable of wireless communication (e.g., Bluetooth®) via a transceiver (e.g., HC-05). That is, the computing system 143 can communicate with a smart device 149. The power system 144 may include a battery that may be replaced or permanent (i.e., rechargeable). In some embodiments, the measuring device 100 may be rechargeable via a charging cord.

Further, a time-of-flight sensor 146 may be connected to the computing system. The time-of-flight sensor 146 may include a TeraRanger Evo 60m or any other time-of-flight sensor that measures distance, level monitoring, etc. The upper surface 116 also includes the time-of-flight sensor 146, meaning the time-of-flight sensor 146 may be positioned in the window 122 on the upper surface 116 of the first section 104. The measuring device 100 may comprise the thermistor as discussed above that is fully implemented in both hardware and software. The thermistor provides accurate temperature readings that ensure that materials, such as grout for laying tile, are used under optimal conditions. In some embodiments, the thermistor may be 10 k ohm, having a line length of approximately 60 mm/2.4 in, and an accuracy of 1%.

Figure 6:
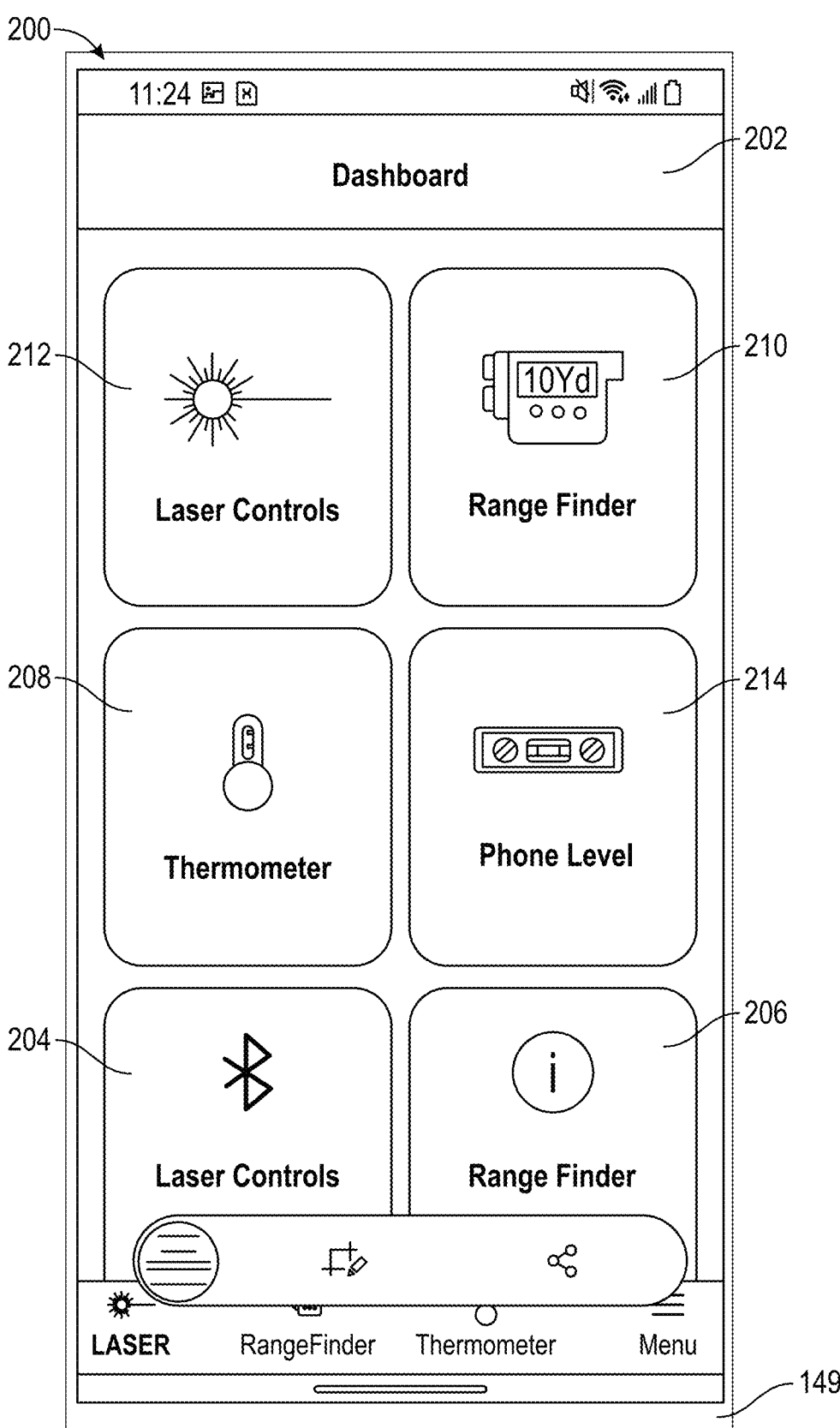
FIG. 6 illustrates a main screen user interface of a mobile application of a measuring device.
Figure 7:
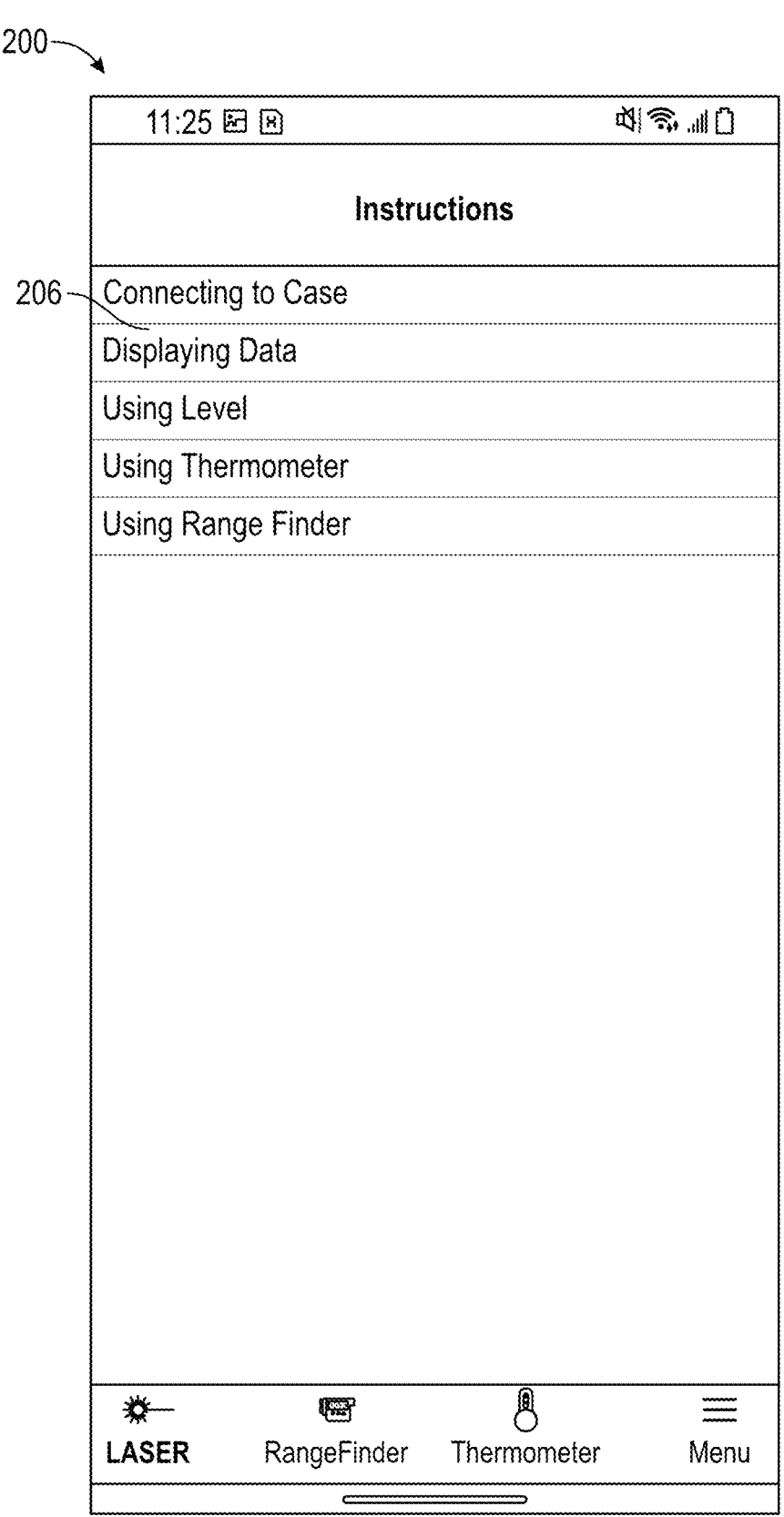
FIG. 7 illustrates an instructions screen of a mobile application of a measuring device.
Figure 8:
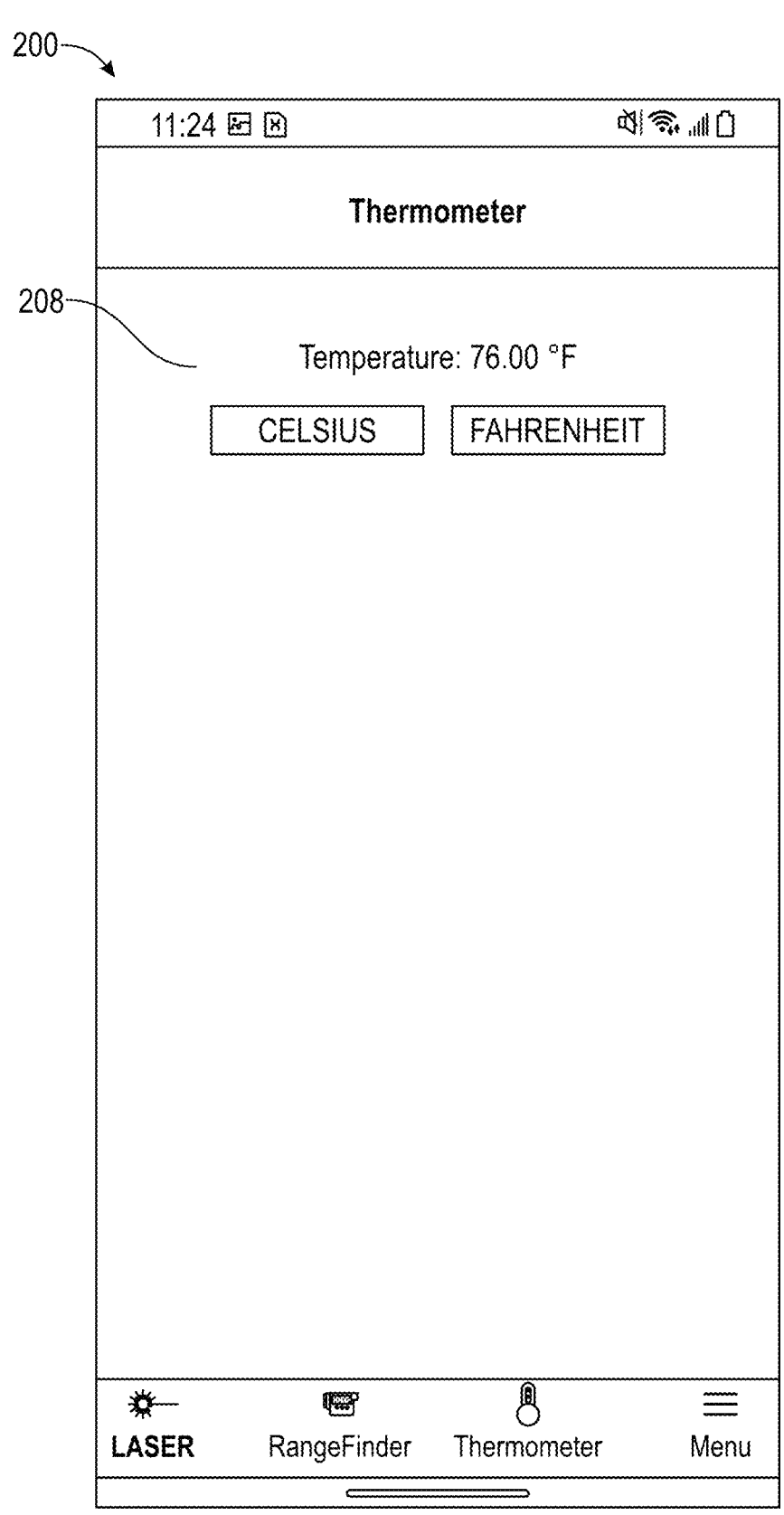
FIG. 8 illustrates a thermometer screen of a mobile application of a measuring device.
Figure 9:
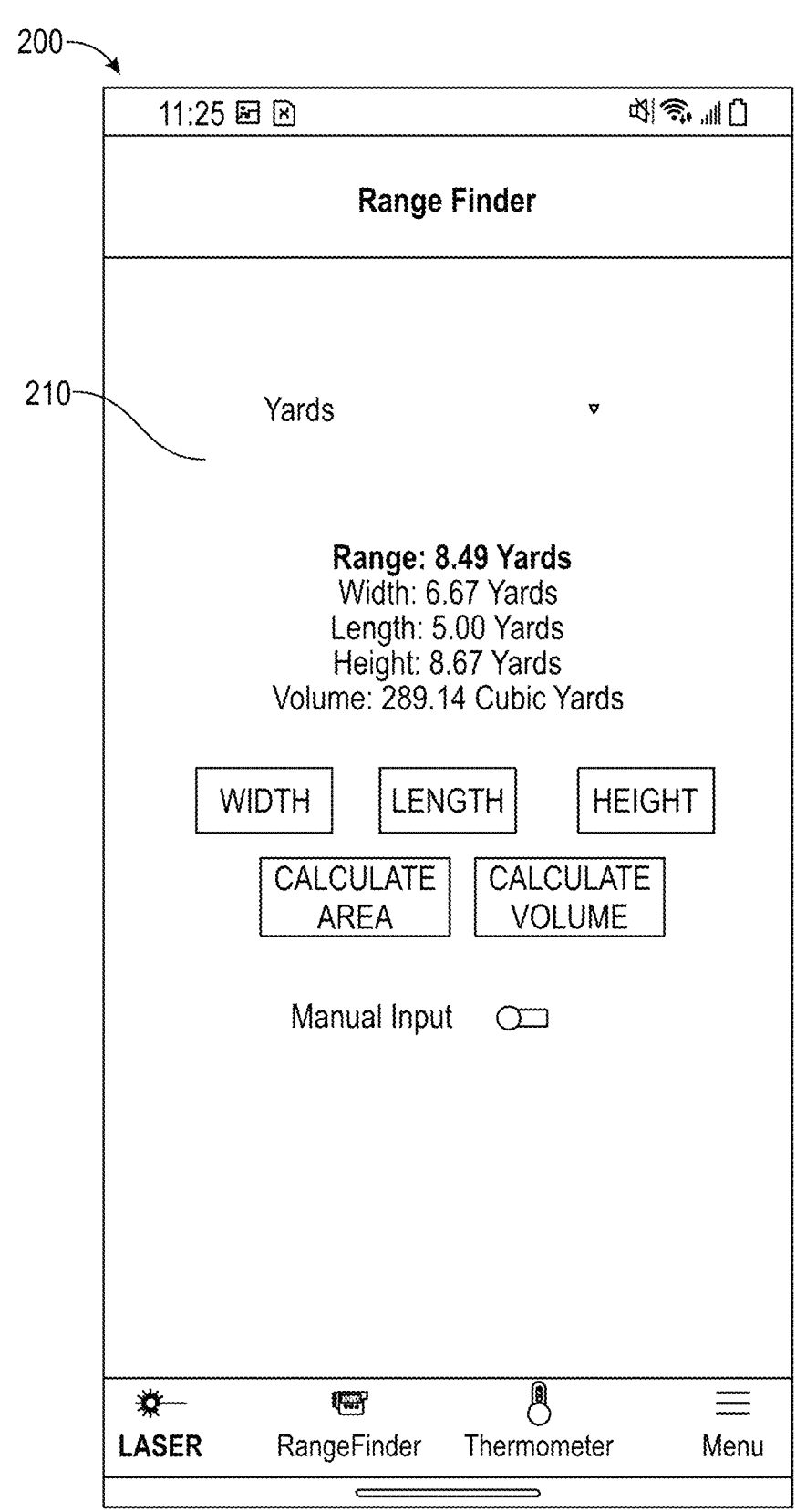
FIG. 9 illustrates a rangefinder screen of a mobile application of a measuring device.
Figure 10:
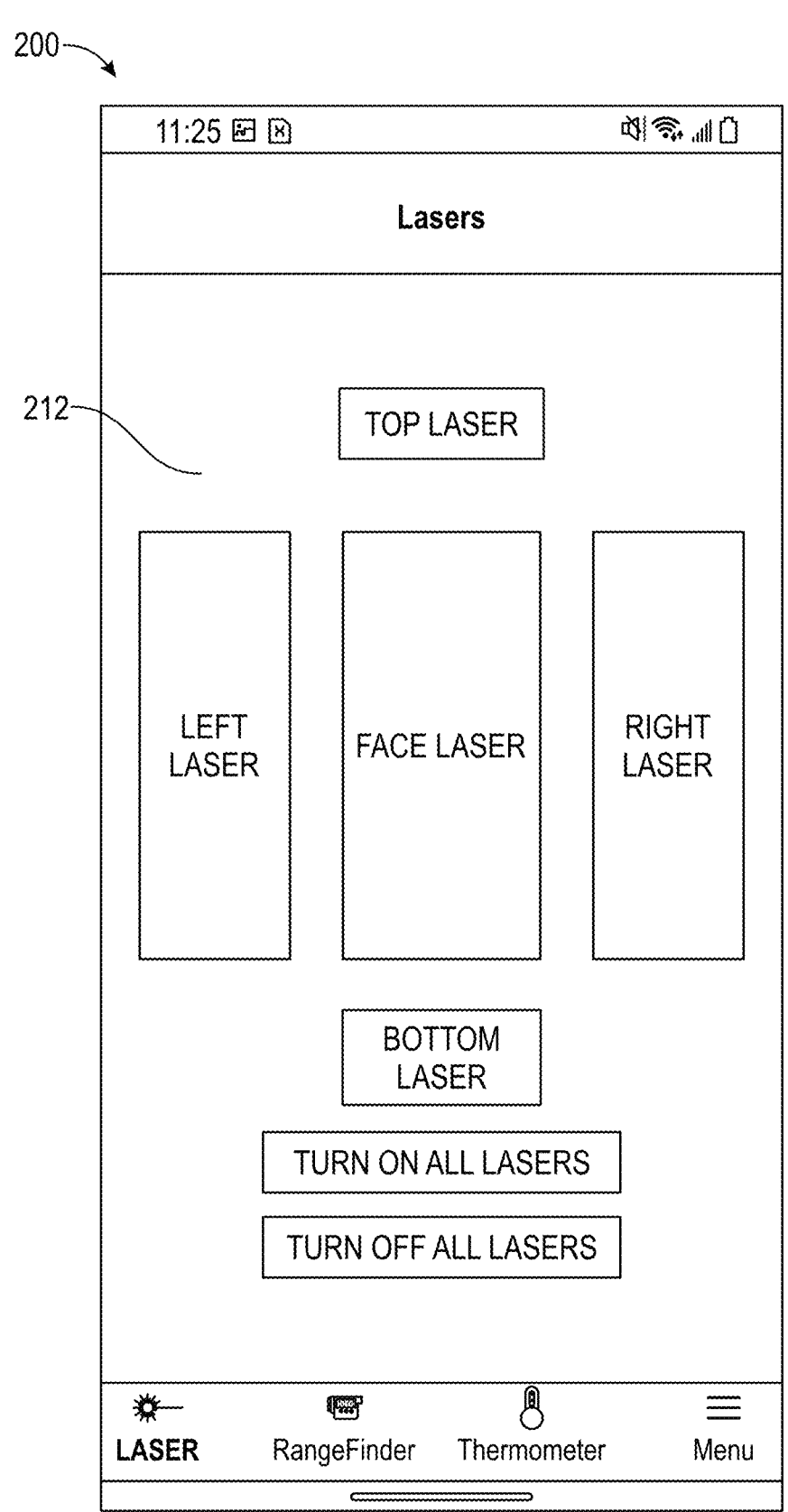
FIG. 10 illustrates a lasers screen of a mobile application of a measuring device.
Figure 11:
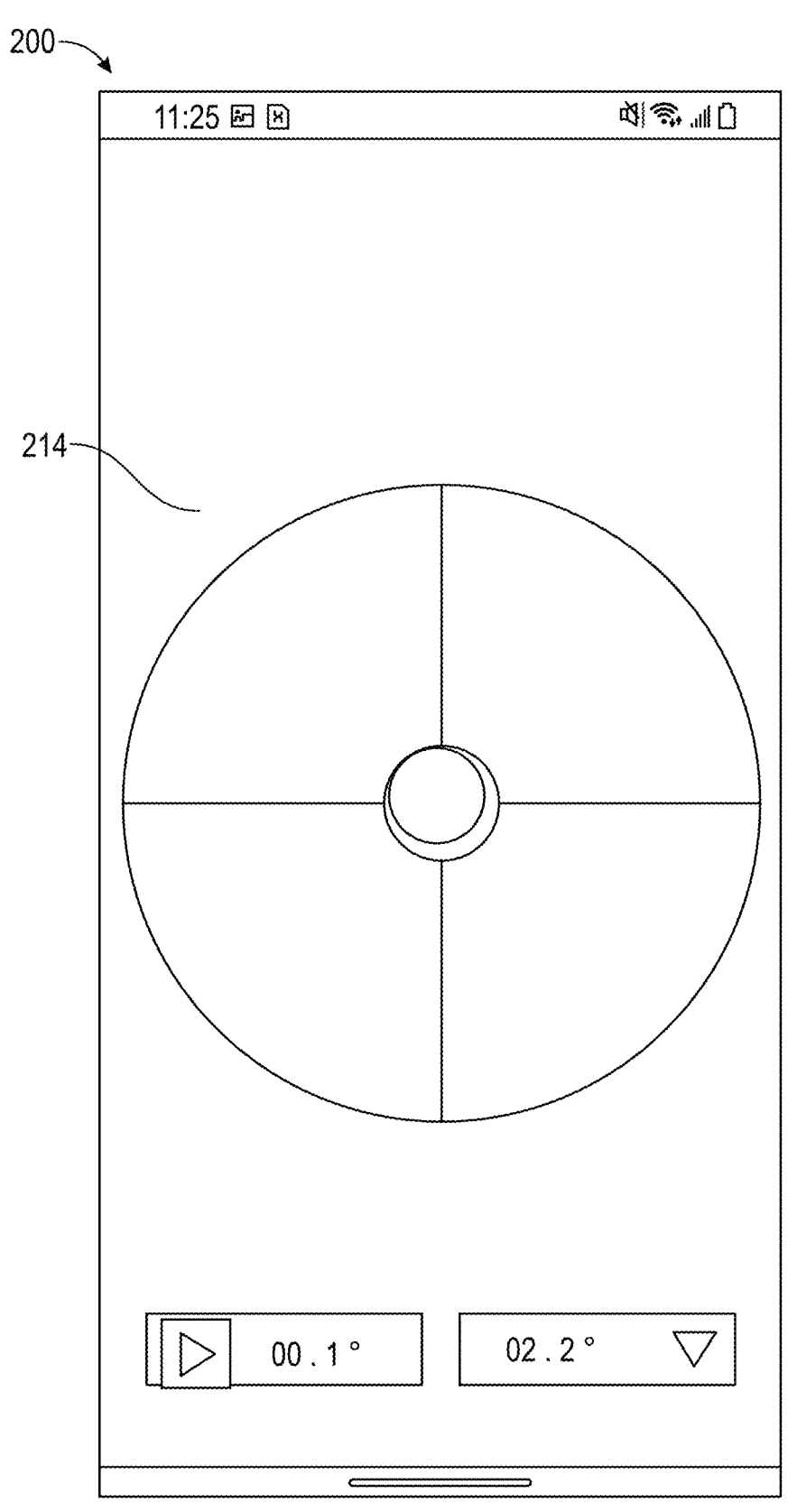
FIG. 11 illustrates a plum bob level screen of a mobile application of a measuring device.
Figure 12:
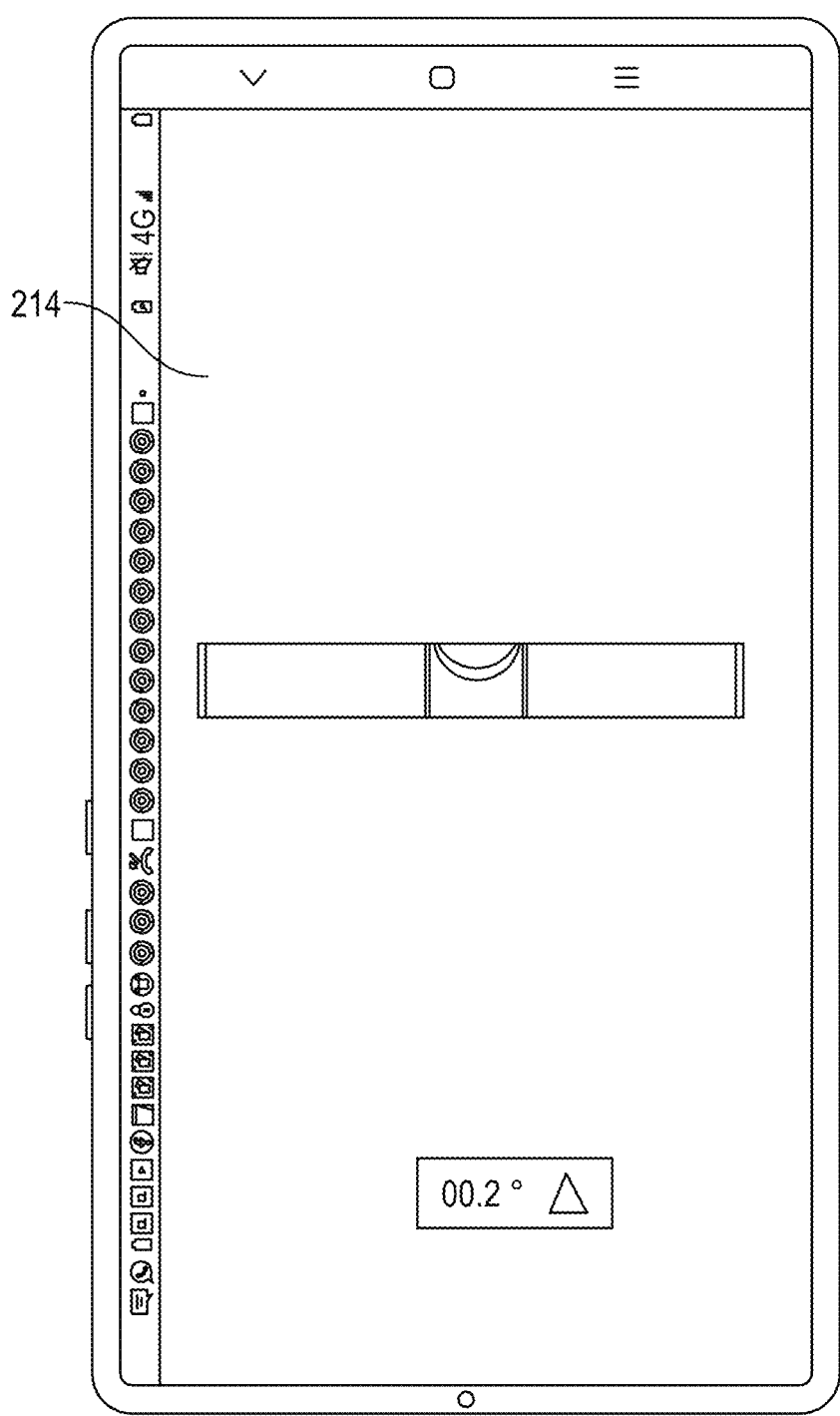
FIG. 12 illustrates a bubble level screen of a mobile application of a measuring device.

In one embodiment, the measuring device 100 may connect to the smart device (e.g., smart phone, tablet, or computer) and communicate with a mobile application 200 on the smart device. As shown in FIGS. 6-12, the mobile application 200 may include multiple screens accessed via tabs that can be opened so as to provide various measurements. Accordingly, a dashboard 202 may include a wireless communications tab (e.g., Bluetooth®) 204, an instructions tab 206, a thermometer tab 208, a range finder tab 210, a lasers tab 212, and a level tab 214 (e.g., a plumb bob tab and bubble level), each of these tabs may be opened via the main, user interface screen or through an access bar present on any of the screens/tabs. The smart device may connect to the measuring device 100 wirelessly (e.g., using Bluetooth®), meaning that the microcontroller communicates with the smart device and mobile application 200 via the transceiver. In some embodiments, the smart device may couple to the measuring device 100 via a wire. Once the measuring device 100 is powered on, a user may connect the mobile application 200 with the measuring device 100 by following the instructions on the wireless communications tab 204. The instructions tab 206 includes various access tabs/bars to assist a user on how to use the mobile application 200, display data, and connect the smart device to the measuring device 100. The thermometer tab 208, once accessed, displays the temperature in any room as measured by the measuring device 100. The temperature may be displayed in Celsius or Fahrenheit. The rangefinder tab 210 can receive and display length, width, height, area and volume of a room, for example, and this information may be gathered via the time-of-flight sensor 146 and lasers 120A-120E. The data may be analyzed via the microcontroller and sent to the smart device, where the user may review the data. If desired, the user may initiate a manual input slider, thereby allowing the user to manually input room measurements. The laser tab 212 allows a user to turn on any of the lasers independently, in pairs, all together, etc. In particular, the lasers 120A-120E, correlating to the top, left, right, face, and bottom lasers, may be turned on one by one, all of them may be turned on by an all on button or may be turned off by an all lasers off button. Further, the level tab 214 allows a user to toggle between a plum bob and a bubble level so that the user can determine levelness of a surface. Overall, it will be appreciated that the measuring device 100 and the mobile application 200 work in tandem to assist a user in performing numerous construction and other tasks.

It will be understood that while various embodiments have been disclosed herein, other embodiments are contemplated. Further, certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure. The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. A measuring device comprising:
    a housing comprising a first member and a second member that are removably attachable to each other, wherein the first member and the second member, when separate, allow access to an internal compartment, wherein the housing comprises a first, upper section that is removably attachable to a second, lower section;
    a first wing with a first aperture, the first wing extending out from and being a part of the first section; a second wing with a second aperture, the second wing extending out from and being a part of the first section; a third wing with a third aperture, the third wing extending out from and being a part of the first section; and a fourth wing with a fourth aperture, the fourth wing extending out from and being a part of the first section; the first and second wings being on a first side of the first section and the second and third wings being on a second side of the first section;
    at least two primary wings with primary apertures, the at least two primary wings extending out from and being a part of the second section, the at least two primary wings being spaced apart from each other; at least two secondary wings with secondary apertures, the at least two secondary wings extending out from and being a part of the second section, the at least two secondary wings being spaced apart from each other; at least two tertiary wings with tertiary apertures, the at least two tertiary wings extending out from and being a part of the second section, the at least two tertiary wings being spaced apart from each other; and at least two quaternary wings with quaternary apertures, the at least two quaternary wings extending out from and being a part of the second section, the at least two quaternary wings being spaced apart from each other;
    wherein the first wing and the at least two primary wings align with each other when the first section is coupled to the second section and receive a first adjustable fastener;
    wherein the second wing and the at least two secondary wings align with each other when the first section is coupled to the second section and receive a second adjustable fastener;
    wherein the third wing and the at least two tertiary wings align with each other when the first section is coupled to the second section and receive a third adjustable fastener;
    wherein the fourth wing and the at least two quaternary wings align with each other when the first section is coupled to the second section and receive a fourth adjustable fastener; and
    a computing system and a power system positioned within the internal compartment.

2. The measuring device of claim 1, wherein each of the adjustable fasteners include a knob that when turned lowers or raises a corner of the housing.

3. The measuring device of claim 1, wherein the first and second members are slidably coupled to each other via one or more slots and protrusions.

4. The measuring device of claim 1, wherein the housing comprises one or more bubble levels.

5. The measuring device of claim 1, wherein housing comprises one or more lasers.

6. The measuring device of claim 1, wherein an upper surface of the housing comprises a window.

7. The measuring device of claim 6, wherein the window receives a time-of-flight sensor.

8. The measuring device of claim 1, wherein the computing system comprises a microcontroller.

9. The measuring device of claim 8, wherein the micro-controller regulates a thermistor and a time-of-flight sensor.

\* \* \* \* \*